United States Patent
Danne et al.

(10) Patent No.: US 6,226,286 B1
(45) Date of Patent: May 1, 2001

(54) APPARATUS AND METHOD FOR COMMUNICATION BETWEEN DATA NETWORK AND TELECOMMUNICATION NETWORK

(75) Inventors: Anders Olof Danne, Kista; Per Bergqvist, Stockholm; Göran Båge, Saltsjöbaden, all of (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 0 days.

(21) Appl. No.: 08/953,537

(22) Filed: Oct. 20, 1997

(51) Int. Cl.[7] .................................................. H04L 12/64
(52) U.S. Cl. ............................ 370/352; 379/900; 709/218
(58) Field of Search ..................................... 370/261, 352, 370/389, 392, 419, 422, 428; 379/88.17, 900; 709/218

(56) References Cited

U.S. PATENT DOCUMENTS

| | | | |
|---|---|---|---|
| 5,675,507 | * | 10/1997 | Bobo ..................................... 709/206 |
| 5,808,587 | * | 9/1998 | Norris et al. .......................... 370/352 |
| 5,943,399 | * | 8/1999 | Bannister et al. ................. 379/88.17 |
| 5,953,392 | * | 9/1999 | Rhie et al. ......................... 379/88.13 |
| 6,052,372 | * | 4/2000 | Gittens et al. ....................... 370/396 |

FOREIGN PATENT DOCUMENTS

| | | | |
|---|---|---|---|
| 41 01 885 | 7/1992 | (DE) | ............................. H04M/11/10 |
| 2 254 981 | 10/1992 | (GB) | ............................. H04M/11/00 |
| WO87/07801 | 12/1987 | (WO) | ............................. H04M/3/50 |
| WO94/24803 | 10/1994 | (WO) | ............................. H04M/11/00 |
| WO 96/20553 | * 7/1996 | (WO) | . |

* cited by examiner

Primary Examiner—Hassan Kizou
Assistant Examiner—Ahmed Elallam
(74) Attorney, Agent, or Firm—Burns, Doane, Swecker & Mathis, L.L.P.

(57) ABSTRACT

The present invention relates to a service node between Internet networks and a telecommunications network, said node being used to order telephony services by means of HTML pages from a computer having a WWW browser. The invention also relates to a method for calling a B subscriber, in which the call is ordered from the computer but the connection is set up between the telephones of the A and B subscribers' telephones. The service node communicates with computers connected to computer networks using the HTTP protocol. The node stores data related to a subscriber; said data can be used when the user requests a telephony service. The node is centrally located, which enables the use of its services even if the user moves to another location and terminal.

15 Claims, 5 Drawing Sheets

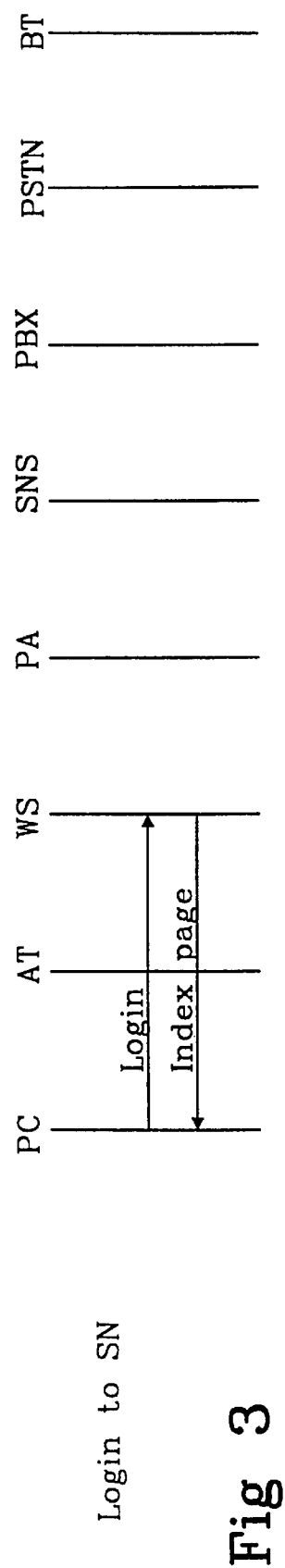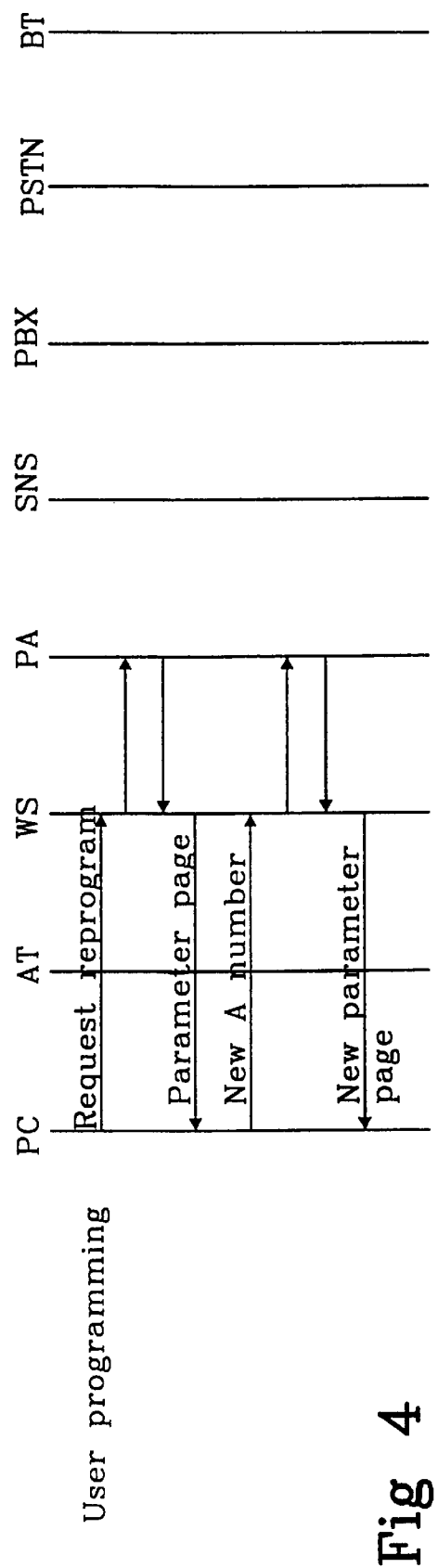

APPARATUS AND METHOD FOR COMMUNICATION BETWEEN DATA NETWORK AND TELECOMMUNICATION NETWORK

TECHNICAL FIELD

The present invention relates to a communication node between data networks and public telecommunications networks.

STATE OF THE ART

Such a communication node between data and telecommunications networks is disclosed in, for example, WO 94/24803. This document describes such a node in a multimedia communication system. The object of the node is to enable communication between users using different types of terminals, such as common telephones, personal computers and workstations.

The published international patent application WO 87/078001 describes a node constituting an electronic mailbox. The object is for the mailbox to be able to receive and store electronic mail sent from different types of sources, such as telephones, computers and fax machines. Messages may have been translated before they reach the mailbox. The electronic letters may subsequently be retrieved from different types of terminals.

Some different types of network architecture for establishing a link between data networks and telecommunications networks are described comprehensively in a report of a final thesis at Luleå Institute of Technology: "Functional Distribution between Co-operating Networks", Bodin and Andreasson. The report briefly describes the design of a node between data networks and telecommunications networks, used to demonstrate the ordering of telephony services from a computer. A user is enabled to order telephony services presented on the computer screen via pages in HTML format. The node consists of a computer with an off-the-shelf software platform.

SUMMARY OF THE INVENTION

The present invention attacks the problem of simplifying the use of telecommunications services for a user by offering a solution with which such telecommunications services in public and private telecommunications networks may be made accessible through a computer. In particular this applies to the ordering from a computer of the set-up of a telecommunications connection between an A subscriber and a B subscriber.

The telecommunications services of today are becoming more and more advanced. The new services are perceived as difficult to use since conventional telephones are only provided with a primitive keypad allowing the user to enter commands or provide data. The telephone also has very limited possibilities for providing visual information.

With the new services, the need also arises to be able to adapt some of the services according to the user's desires. Thus the need for several alternative solutions for exchanging information with the user is further increased.

Another problem is avoiding having to equip the user's computer with special software to enable the ordering of telecommunications services from it. It should be sufficient for the computer to be provided with prior art software for communication, and said software should also be useful for other purposes than for ordering telephony services.

A further problem is that the user should have access to personal stored information concerning telecommunications services even if he/she moves geographically and changes computer and telephone equipment.

A purpose of the present invention is thus to enable a user to order telecommunications services, especially connection of calls, by means of a computer, in a way that is simple for the user and to provide subscriber related data that can be used for this purpose, and to give access to these telecommunications services and this user related data even if the user moves geographically and to another telephone and/or computer.

A service node is provided, constituting a link between the data network and the telecommunications network. The service node has an interface to a telephone exchange through which public and private telecommunications networks can be accessed. The service node also has a WWW interface through which a communication connection to a computer can be established through a data network using the HTTP protocol. The computer is equipped with a WWW browser and receives data in HTML format from the service node. The data is presented on a screen connected to the computer, in the form of pages comprising, among other things, active fields. A user requests a service using said active fields by means of the computer. The service node receives the request for a telephony service or programming of subscriber related data from the computer in order for the data to be registered by the service node. The service node performs the requested service and sends the result to the computer in a new HTML page, which is presented to the user on the screen.

The service node is comprised of a web server, a personal assistant and a service node selector. The personal assistant constitutes a control and supervision part of the service node and communicates both with the service node selector and the web server.

The personal assistant handles various subscriber services.

The personal assistant controls the service node selector, which is connected to telecommunications and mobile telecommunications networks.

The personal assistant can, by means of the service node selector, make outgoing calls, receive calls and interconnect incoming and outgoing calls.

The personal assistant stores information associated with a user. The user can retrieve and store personal information by means of a computer telecommunications terminal of his/her choice or.

A user can log in to the service node from a computer with a WWW browser. The web server handles the communication with the computer by transmitting WWW pages in the mark-up language HTML, said pages being presented on the user's computer. The user may enter commands using active fields in the presented HTML page. The commands are transmitted to the web server using the HTTP protocol. The commands are forwarded by the web server to the personal assistant.

The personal assistant makes sure the command is executed. The result is then transmitted to the web server, which generates a new HTML page presenting the result of the command to the user.

The invention makes it possible to simplify the user control of telephony services by means of a computer.

The invention may be utilized by several users as the protocol used for communication with the service node is found in most network connected computers. Programs such as WWW browsers are widely deployed in network connected computers.

The invention enables the storage of data associated with a user in a central node. This data is accessible to the user and may be changed even if the user moves to a different location and uses different terminals. The stored data may be used when a telephone connection with a B subscriber is being set up.

The invention will in the following be described in more detail by way of preferred embodiments and with reference to the enclosed drawings.

BRIEF DESCRIPTION OF THE DRAWINGS

FIGS. 3, 4, 5 are sequence diagram of the signalling between the parts of the system.

DESCRIPTION OF THE ANNEX

The annex contains the complete syntax of the application protocol which constitutes part of the invention.

DESCRIPTION OF PREFERRED EMBODIMENTS

Figure 1:
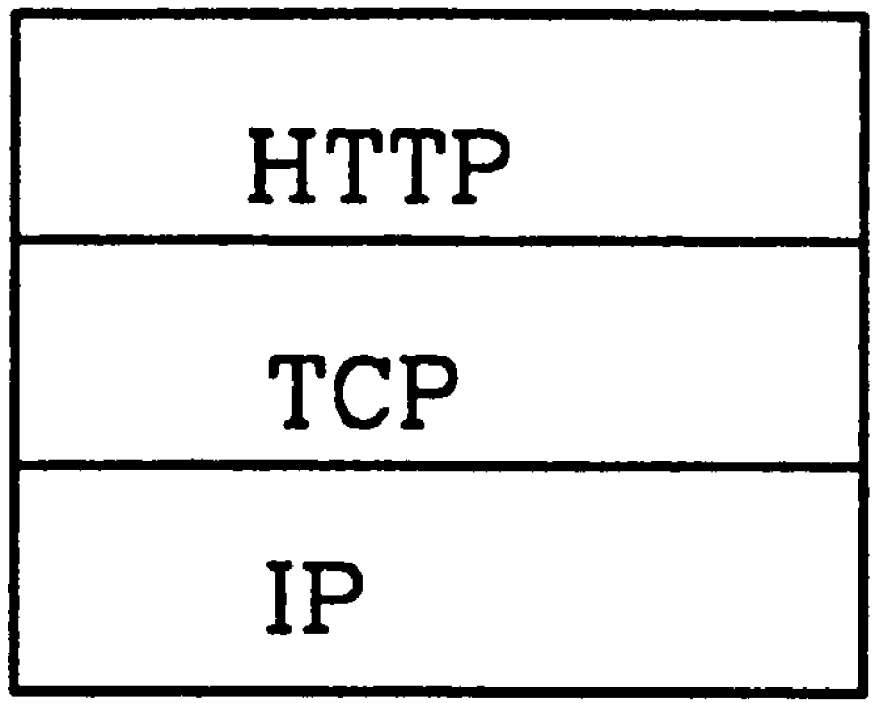
FIG. 1 shows a protocol stack known per se, used in the Internet

The Internet is an important precondition for the applicability of the present invention and will therefore be described briefly here. The Internet in this context means any data network using a protocol stack having an Internet Protocol (IP) layer. Upon the IP another protocol, the Transmission Control Protocol (TCP) is used. These two protocol layers are shown in FIG. 1. The IP protocol may be used in different types of physical data networks, hence FIG. 1 does not show the protocols below the IP layer. Also, different protocols for different types of applications may be added on top of the TCP layer. FIG. 1 shows the HTTP protocol on top of the TCP, since this protocol is used in the application of the present invention.

On the HTTP protocol data can be transferred in the mark-up language Hyper Text Meta Language (HTML). In a computer PC, for example, a personal computer or a mainframe computer with user terminals, with WWW browser software, for example Netscape Navigator or Mosaic, received data is presented according to its HTML format on the screen in the form of pages comprising pictures, graphics and text. The presented HTML pages also comprise so called active fields by means of which the users can request different types of services. The active fields are made up of buttons, fields for entering text, and hypertext links. The user may, for example using a mouse connected to the computer, move a cursor over the page to place it on a button or a hyper text link and then press a mouse button. This will in the following be referred to as clicking a button or a hyper text link, respectively. In this way a command is transferred to another computer, a so called web server connected to the data network, on the HTTP protocol. The command may cause a new HTML page to be transmitted to the user's computer PC where it is presented, or a search for information to be started in a database. The result of said search will be presented to the user on a new HTML page.

Figure 2:
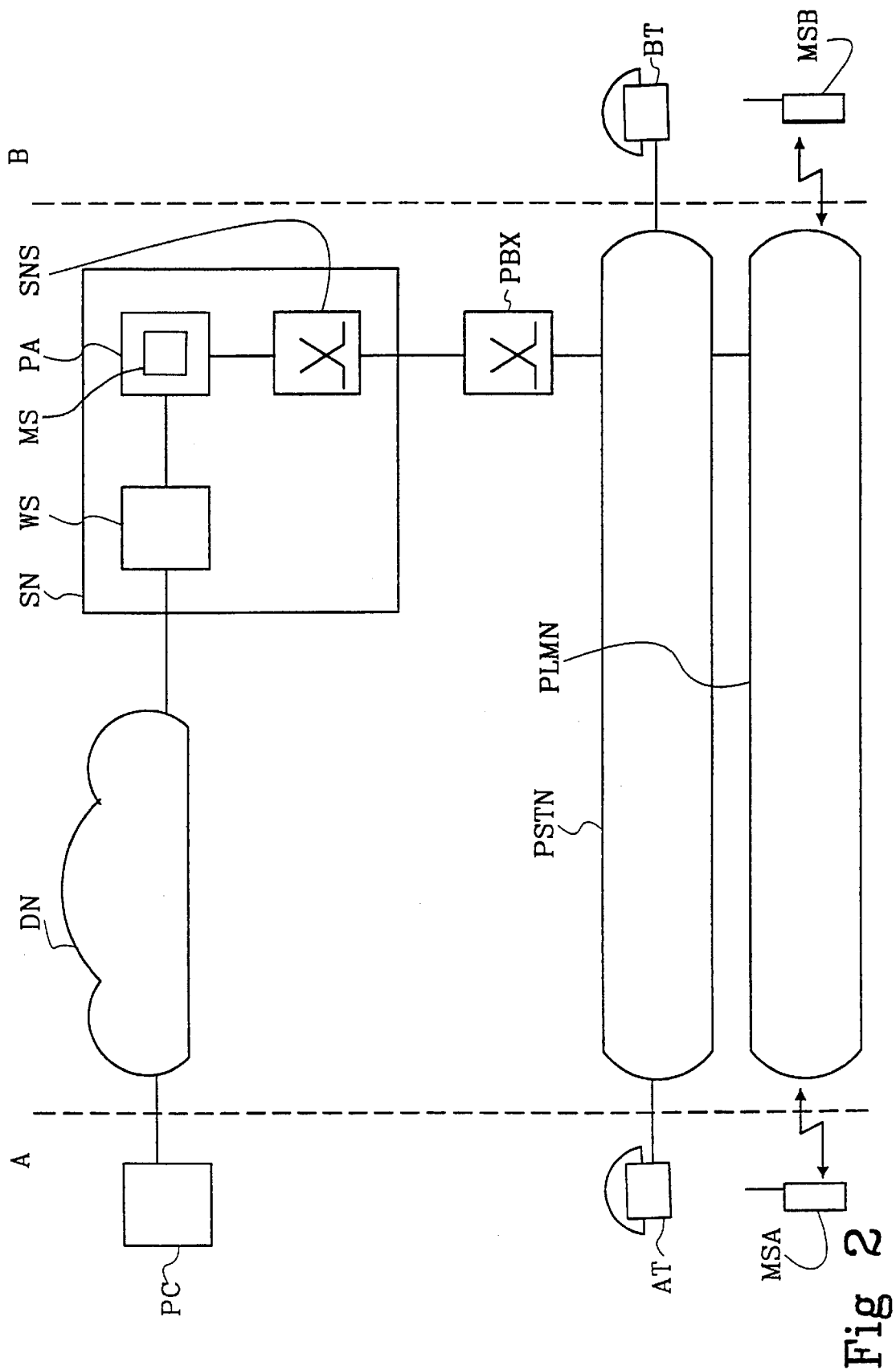
FIG. 2 shows a schematic block diagram of units comprised in the communication system of which the invention is part.

FIG. 2 is an overview of the communication system in which the method according to the invention is applied. The apparatus according to the invention is comprised of a service node SN.

The service node SN has a WWW interface for communication in data networks using the HTTP protocol. The service node SN has another interface towards a telephone exchange, which is shown in FIG. 2 as a private branch exchange PBX, but may also be another type of exchange. Through the exchange PBX connections may be established in public or private telecommunications networks. It is also possible to connect the service node SN directly to a telecommunications network without an exchange therebetween. In the description below only the case in which the communication with a telecommunications network is set up through an exchange is shown. In FIG. 2 two public telecommunications networks are shown: a conventional Public Services Telephone Network (PSTN) and a cellular mobile telecommunications network PLMN. It is also possible to connect to other types of telecommunications networks than the ones shown in FIG. 2, such as Integrated Services Digital Network (ISDN) or private telecommunications networks. To each of the telecommunications networks a number of telephones, mobile telephones, telefaxes and other types of telecommunications terminal are connected. FIG. 2 only shows one telephone AT and one mobile telephone MSA belonging to an A subscriber, and a telephone BT and a mobile telephone MSB belonging to a B subscriber.

The A subscriber also has access to a computer PC. The computer PC may be a personal computer with units for user communication such as a screen, a mouse and a keyboard, or a mainframe computer having a user terminal. The computer is provided with a WWW browser and connected to a data network in which the TCP/IP and HTTP protocols are used, in a conventional way. FIG. 2 shows this data network as a cloud referenced as DN.

The service node SN is comprised of three parts: a web server WS, a personal assistant PA and a service node selector SNS.

The web server handles the communication with the computer PC by generating HTML pages, which are then transferred to the computer through the data network DN. The user requests a service using the above described active fields in these pages. When the A subscriber has entered text or clicked a button or a hypertext link, a command specifying the requested service is sent from the computer PC to the web server WS, using the HTTP protocol. The web server transfers the command on to the personal assistant PA. The web server WS and the personal assistant communicate by means of an application protocol. The application protocol uses TCP/IP for transport and thus constitutes a protocol layer on top of TCP/IP. The protocol implies that commands and other information being exchanged between different computers use an established syntax in order to be interpreted in the same way in the different computers. This means that computers having different operating systems and software written in different programming languages, can communicate with each other. In this way the web server WS and the personal assistant PA, both constituting parts of the present service node, may be computers from different vendors. The complete syntax of the application protocol is described in the annex.

The personal assistant PA is the control unit of the service node. The personal assistant handles the command transmitted from the computer PC and makes sure it is executed. If the command from the computer PC, received by the personal assistant PA implies that a service is to be performed in one of the telecommunications networks PSTN, PLMN, the personal assistant PA orders the service node selector SNS to set up a connection with the appropriate network. The personal assistant then performs the steps required to perform the requested service. The command from the computer PC received by the personal assistant PA may also imply that the personal assistant PA is to provide or store information from/to memory space MS of the personal assistant PA, for example programming of user data. When the personal assistant PA has performed, or failed in performing, a requested service, the personal assistant PA transmits the result to the web server, which enters the result into an HTML page and forwards it to the computer PC, which presents it to the A subscriber.

The service node selector SNS is able to set up connections to the telecommunications networks PSTN, PLMN, upon orders from the personal assistant PA. The service node selector is also able to connect to existing connections, upon orders from the personal assistant. As described below, this function will be utilized in the present method.

Figure 5:
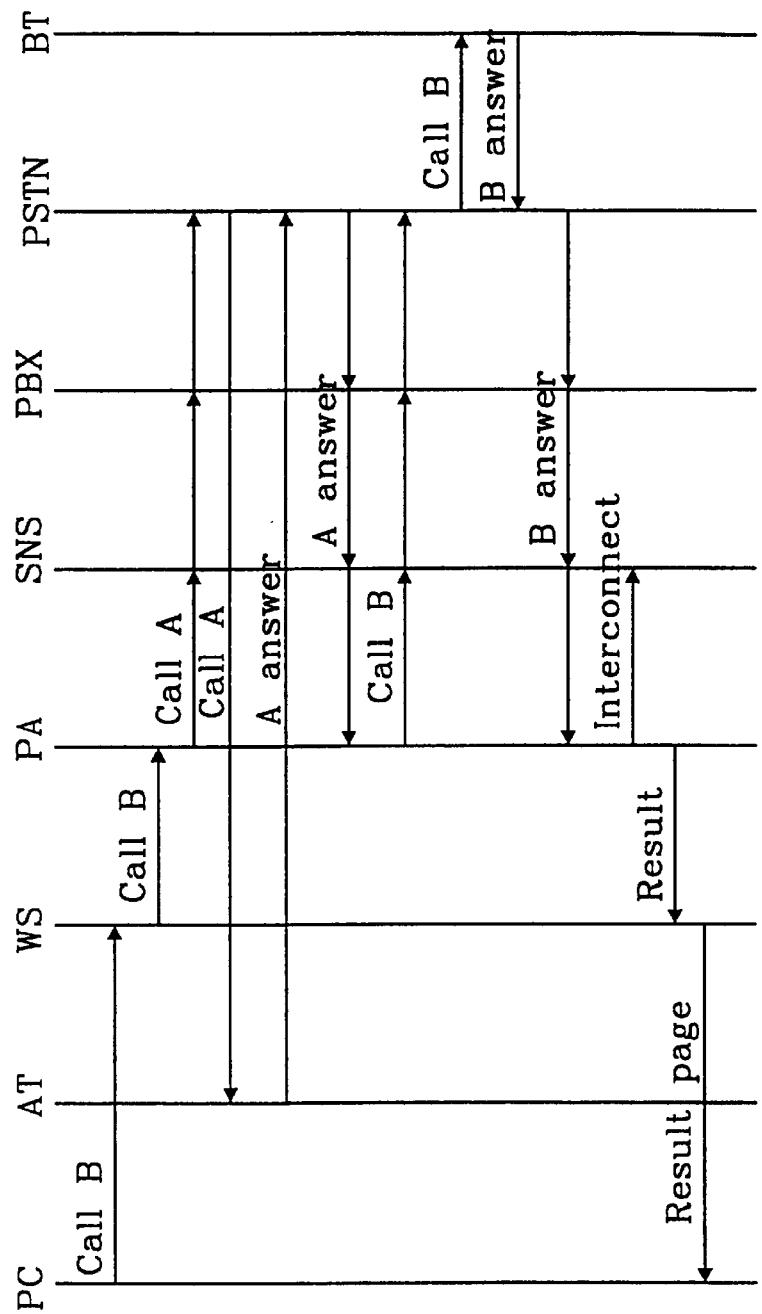

The commands exchanged between the computer PC, the telephone AT of the A subscriber, the web server WS of the service node, the personal assistant PA of the service node, the service node selector SNS of the service node, the private branch exchange PBX, the public network PSTN and the telephone BT of the B subscriber, when a service is requested by the A subscriber, are shown in FIGS. 3, 4 and 5.

FIG. 3 shows the login procedure to the service node SN. The user has first retrieved a presentation page from the service node SN, using his computer PC. In this page, the user enters his identity and password in fields intended for this information. This data is then transmitted to the web server WS with a login request. The request is approved after the web server has checked and verified the identity and password by a query to the personal assistant PA. The web server WS then transmits a new page to the computer PC comprising an index of available services and data, a so called index page.

In the obtained index page, the user clicks on a hypertext link to request user programming in the personal assistant PA. Programming of user data involves the A subscriber changing or adding information related to the user, which is stored in the personal assistant PA in memory space MS. Programming of user data is necessary for the personal assistant to know what telecommunications terminal the A subscriber intends to use. If the A subscriber wishes to change the telecommunications terminal, this is done by reprogramming the user data in the personal assistant. The A subscriber can also register the names and identities of other telecommunications subscribers, with photos if desired, to facilitate the ordering of telephone services. This data can thus constitute a personal telephone directory for the A subscriber. It is also possible to register telecommunications commands in the personal assistant to facilitate their use. Names, identities and other information registered can be used as hypertext links or active fields, when presented to the user on an HTML page, to facilitate making calls or using the data in another way.

FIG. 4 shows signal sequences in user programming when the A subscriber changes his own telephone AT. The request is transferred through the data network DN to the web server WS which in turns forwards the request to the personal assistant PA. The personal assistant, in which the user data is stored, transmits a set of parameters to the web server WS. The web server enters the parameters into an HTML page and transmits the page to the computer PC. In the present example the A subscriber wishes to change his telephone. If the identity of the new telephone is already stored in the personal assistant PA and registered on the parameter page, the A subscriber can enter a new telephone by, for example, clicking on the hypertext link of the new telephone. If the telephone to which the A subscriber wishes to change is not registered, the identity of the new telephone, the A number, is entered in a field intended for this information on the parameter page. The request for a new A number is received by the web server WS, which forwards the request to the personal assistant PA. The personal assistant registers the new A number and then transmits a new set of data to the web server. The web server WS enters this data in a new parameter page in HTML format which is transmitted to the computer PC. The telephone to which the service node SN will connect the A subscriber's calls is then presented to the A subscriber on the screen of the computer PC.

Figure 6:
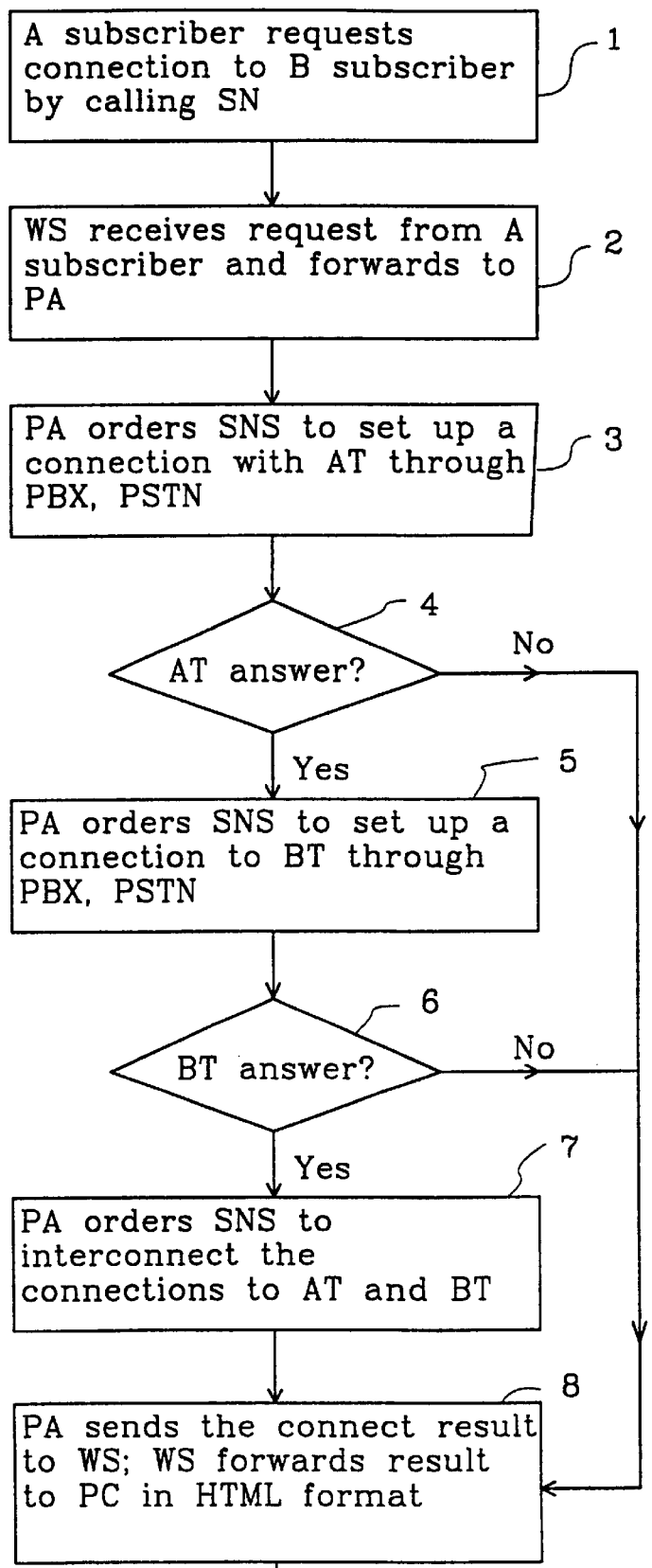
FIG. 6 is a flow chart of the method for connection.

The A subscriber can retrieve the index page stored in the computer PC after login. The user requests the set-up of a telephone connection between his own telephone AT and a B subscriber's telephone, for example by typing in the B number in a field on the index page intended for this information. It is, however, easier for the user if the B number is already stored in the above described personal telephone directory. The telephone directory may either have come with the index page or be retrieved to the computer PC in HTML format from the personal assistant PA through the web server WS in the same way as the data page. From the telephone directory the A subscriber requests a call by, for example, on his computer, clicking on a hypertext link with the B subscriber's name. FIG. 6 shows the procedure when a call is made. In the first block 1 the A subscriber requests the B subscriber to be called, from his computer PC, in any of the above described ways. FIG. 5 shows the signalling sequence when a call is made. The request to call the B subscriber is transferred from the computer PC to the web server WS, which forwards the request to the personal assistant PA, which is also shown in step 2 in FIG. 6.

The personal assistant PA orders the service node selector SNS to call the A subscriber's telephone AT. The service node selector calls the telephone AT through the exchange PBX and the public network PSTN, corresponding to step 3 in FIG. 6.

When the A subscriber has answered, by lifting the hook of the telephone AT, step 4, the connection is set up between the personal assistant and the A subscriber through the public telecommunications network PSTN, the exchange PBX and the service node selector SNS. The personal assistant PA then orders the service node selector to call the B subscriber's telephone BT. The service node selector SNS sets up a connection to the B subscriber's telephone in the same way as with AT, as represented by step 5. When the B subscriber has answered, in step 6, the personal assistant PA orders the service node selector SNS to connect the two connections. In this way a connection between the two telephones AT and BT is established, see step 7 in FIG. 6.

The procedure would have been interrupted after a certain period of time if one of the parties had not answered, see steps 4 and 6. The personal assistant PA transfers the result of the set-up, or the failed set-up, to the web server WS, which transfers it, in HTML format, to the computer PC, where it is presented to the A subscriber. This is shown in the final step 8 in FIG. 6.

The method for connection set-up described above can also take place in modified ways. The set-up of connections for calling the A subscriber and the B subscriber, respectively, can take place in a different order than the one described above, and independently of whether or not the other party has answered the call. Interconnection of the two connections can be made even if one of the parties has not answered the call.

For example, in a modified embodiment, the connection between the service node and a B subscriber may be established independently of whether or not the call made to the A subscriber's telephone was answered.

The method can also be modified to let the B subscriber be called before the A subscriber.

In another modified embodiment the connection to the A subscriber and the connection on which the B subscriber's telephone is being called, are interconnected.

A further modification, for the case when the B subscriber answers the call first, consists of the service node interconnecting the connection to the B subscriber and the connection on which the A subscriber's telephone is being called. For the cases when the B subscriber is the first to answer the call, the service node provides a spoken message that a call is being made from another subscriber.

The service node SN also handles incoming connections to the A subscriber if call forwarding has been set up from the called identity to the service node SN.

The A subscriber can, in the desired order and after logging in to the service node SN, reprogram user related data or request a telecommunications service, such as call set-up. Other telecommunications services handled by the service node SN are, for example, electronic mail, transmission or reception of telefax, whereby the service node functions as a mailbox for e-mail, fax and voice messages.

What is claimed is:

1. A method for setting up a telecommunications connection between a calling A subscriber and a B subscriber through a telecommunications network by a computer available to the A subscriber and provided with a WWW browser, said computer having access to a service node through a network in which HTTP protocol is used, said service node receiving and processing orders for telephony services and for registration of subscriber data and said A subscriber having access to at least one telecommunications terminal connected to the telecommunications network, the method comprising the steps of:

a) transmitting, on request, a set of data in the HTML format from said service node to the A subscriber's computer, said data comprising an offer to call the B subscriber using the B subscriber's identity;

b) presenting the set of data as an HTML page;

c) requesting a call to said B subscriber by seeking access to said identity;

d) transmitting said call request by the A subscriber's computer to said service node using said HTTP protocol, said service node receiving said call request and forwarding it within the node using an application protocol;

e) setting up a first connection, in reply to said call request, between the service node and the telecommunications network, said service node requesting a call to said telecommunications terminal used by the calling A subscriber;

f) setting up a second connection between said service node and the telecommunications network, said service node requesting a call to the B subscriber's telecommunications terminal; and g) interconnecting the first and second connections established according to e) and f) when at least one of the called A and B subscribers has answered the call, for connection between said A and B subscribers.

2. A method according to claim 1, wherein the second connection according to f) is not set up until the A subscriber has answered said call.

3. A method according to claim 2, wherein both connections are set up after the B subscriber has answered the call.

4. A method according to claim 1, wherein the two connections are interconnected after the A subscriber has answered the call.

5. A method according to claim 1, wherein before the call is requested by the A subscriber according to step c), the A subscriber has registered data in the service node, by performing the following steps:

a) transmitting a request for programming of user data by the A subscriber's computer to the service node through the HTTP protocol;

b) forwarding said request for programming within the service node through the application protocol, and subsequently processing said request;

c) transmitting a set of user related data within the service node through the application protocol, and subsequently forwarding said set of data according to the HTTP protocol through a data network to the A subscriber's computer;

d) presenting the set of user related data as an HTML page on a screen connected to said computer, said A subscriber entering a command using active fields in the HTML page presented on screen, to add new data entered by the A subscriber to previously stored user data; and e) transmitting the command described in d), and transmitting the data listed in d), to the service node, by means of the computer and by means of the HTTP protocol, forwarding said command and said data within the service node through the application protocol and subsequently registering said data.

6. A method according to claim 5, wherein the command entered by the A subscriber under d) provides an instruction as to what telecommunications terminal the A subscriber intends to use.

7. A method according to claim 6, wherein the identity of said telecommunications terminal the A subscriber intends to use has been previously registered in the service node upon a command from the A subscriber.

8. A method according to claim 5, wherein the identity of said terminal the A subscriber intends to use is transmitted with said command for registration in the service node.

9. A method according to claim 5, wherein the command entered by the A subscriber under d) comprises data about the identity of the B subscriber.

10. A method according to claim 1, wherein the A subscriber logs in to the service node using a password entered into a field intended for this information on an HTML page before the request to call the B subscriber, or the user programming, is processed.

11. A method according to claim 1, wherein in that the service node, after receiving and processing a request for connection, transfers the result of the set-up procedure to the computer in an HTML format.

12. A service node constituting a link between a data network, in which HTTP protocol is used, and at least one telecommunications network, said service node being used to request a telecommunications service from an A subscriber's computer through the data network, the service node comprising:

a) a web server for communication with said computer through the data network using the HTTP protocol;

b) a service node selector connected to the at least one telecommunications network to set up two separate connections in the telecommunications network, one of which connects a telecommunications terminal belonging to the A subscriber and the other connecting a telecommunications terminal belonging to a B subscriber, in order to subsequently interconnect the two connections; and c) a personal assistant having a communication connection to the web server and a communication connection to the service node selector, said personal assistant handling the request for a telecommunications service and ensuring it is performed by controlling the service node selector.

13. A service node according to claim 12, wherein the personal assistant comprises a memory space for storing user related data.

14. A service node according to claim 13, wherein the memory space of the personal assistant is used for storing on identity of the A subscriber's terminal, to enable establishment of a telecommunications connection with the A subscriber's terminal.

15. A service node according to claim 12, wherein the memory space of the personal assistant is used for storing an identity of B subscriber's terminal, to enable the establishment of a telecommunications connection with the B subscriber's terminal.

* * * * *